United States Patent
Chen et al.

(10) Patent No.: US 8,865,782 B2
(45) Date of Patent: *Oct. 21, 2014

(54) FIRE-RESISTANT POLYURETHANE FOAM

(71) Applicant: Industrial Technology Research Institute, Hsinchu County (TW)

(72) Inventors: Po-Ju Chen, Hsinchu (TW); Sung-Jeng Jong, Pingtung Hsien (TW); Ren-Kuen Chang, Hsinchu (TW); Chin-Shang Hsu, Zhubei (TW); Jer-Young Chen, Hsinchu (TW); Yih-Her Chang, Hsinchu County (TW); Chei Kao, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,805

(22) Filed: Nov. 6, 2013

(65) Prior Publication Data

US 2014/0058006 A1    Feb. 27, 2014

Related U.S. Application Data

(62) Division of application No. 12/900,478, filed on Oct. 8, 2010, now Pat. No. 8,604,093.

(30) Foreign Application Priority Data

Nov. 20, 2009    (TW) ............................... 98139458 A

(51) Int. Cl.
*C08G 18/08*    (2006.01)

(52) U.S. Cl.
USPC ............. 521/99; 521/100; 521/123; 521/170; 521/172; 521/173; 521/174

(58) Field of Classification Search
USPC ............ 521/99, 100, 123, 170, 172, 173, 174
See application file for complete search history.

(56) References Cited

U.S. PATENT DOCUMENTS

| 6,706,774 B2 * | 3/2004 | Munzenberger et al. ....... 521/99 |
| 2002/0052425 A1 * | 5/2002 | Kaku et al. .................... 521/137 |

FOREIGN PATENT DOCUMENTS

| JP | 51-030298 | 3/1976 |
| JP | 09-506137 A | 6/1997 |

OTHER PUBLICATIONS

Office Action issued by the Japan Patent Office on Apr. 8, 2014, regarding the above-referenced application's counterpart application in Japan (Application No. 2010-260224).

* cited by examiner

*Primary Examiner* — John Cooney
(74) *Attorney, Agent, or Firm* — Pai Patent & Trademark Law Firm; Chao-Chang David Pai

(57) ABSTRACT

A fire-resistant polyurethane foam is provided. A hydroxyl-containing inorganic fire retardant is premixed with a polyisocyanate and a polyol, respectively, to form two premixtures. Then, the two premixtures are mixed for reaction to form a fire-resistant polyurethane foam. Preferably, a combination of different particle sizes of the fire retardant is employed to maximize the amount of the fire retardant and increase the fire resistance of the foam.

8 Claims, 8 Drawing Sheets

FIRE-RESISTANT POLYURETHANE FOAM

CROSS REFERENCE TO RELATED APPLICATIONS

This application is a divisional of pending U.S. patent application Ser. No. 12/900,478, filed on Oct. 8, 2010, which claims priority of Taiwan Patent Application No. 98139458, filed on Nov. 20, 2009, the entirety of which is incorporated by reference herein.

TECHNICAL FIELD

The technical field relates to a fire-resistant polyurethane foam.

BACKGROUND

Fire-resistant construction materials are classified into three groups: inorganic fiber board, inorganic fiber cotton, and organic fire-retardant foam. Inorganic fiber board is relatively heavy and has a fixed shape which restricts its use and the thermal insulation is unsatisfactory. Inorganic fiber cotton has superior fire resistance and thermal insulation, but has no mechanical strength. Organic fire-retardant foam, such as phenolic foam, is light and has good thermal insulation. However, organic foam generally has poor fire resistance, and tends to shrink and gasify under exposure to flames.

A polyurethane foam incorporated with inorganic fire retardant combines the advantages of organic and inorganic materials, which are, high processability, light-weight, and high thermal insulation for organic materials and excellent fire resistance for an inorganic materials. However, in the conventional art, an inorganic fire retardant is merely physically blended in polyurethane, exhibiting limited improvement in fire resistance. Furthermore, the additional amount of the inorganic fire retardant has restriction. For example, the maximum permissible amount for a 1 μm aluminum hydroxide in polyurethane is only 36.5 wt % (based on the total weight of the fire resistant foam). If the amount exceeds the value, the resulting mixture would not be processable due to unusually high viscosity.

FIG. 1 illustrates a fabrication scheme of a fire-resistant polyurethane foam disclosed by Canadian Patent No. 1222599A1 and U.S. Pat. No. 4,317,889, wherein a fire retardant is first added to a polyol, which is then mixed with a polyisocyanate to cause a foaming reaction. Because the fire retardant is only present in the polyol, the amount of the fire retardant (and therefore the fire resistance) is limited by the volume of the polyol solution.

FIG. 2 illustrates another fabrication scheme of a fire-resistant polyurethane foam disclosed by U.S. Pat. No. 6,010,565 and GB 1472245, wherein a fire retardant, a polyisocyanate, and a polyol are mixed together simultaneously. Because the contact of the polyisocyanate and the polyol initiates the foaming reaction immediately, it is not possible to incorporate a large amount of the fire retardant in such a short period.

FIG. 3 illustrates a further fabrication scheme of a fire-resistant polyurethane foam disclosed by GB 1499168 and EP0308769B1, wherein an open-cell polyurethane foam is impregnated with a cross-linkable latex solution including aluminum hydroxide.

It should be noted that the conventional art uses a single particle size for the inorganic fire retardant. None of the above cited references address the effect of using inorganic fire retardants having different particle sizes.

SUMMARY

According to one aspect of the disclosure, a method for fabricating a fire-resistant polyurethane foam is provided, which comprises premixing a polyisocyanate and a hydroxyl-containing inorganic fire retardant to form a first premixture, wherein the polyisocyanate reacts with the hydroxyl-containing inorganic fire retardant to form a chemical bond; premixing a polyol, a blowing agent, and the hydroxyl-containing inorganic fire retardant to form a second premixture; and mixing the first premixture and the second premixture to proceed with a foaming reaction to obtain a fire-resistant polyurethane foam.

According to another aspect of the disclosure, a fire-resistant polyurethane foam is provided, which comprises a polyurethane; about 50-80 wt % of a hydroxyl-containing inorganic fire retardant, based on the weight of the fire-resistant polyurethane foam, wherein the hydroxyl-containing inorganic fire retardant reacts with the polyurethane to form a chemical bond; wherein the fire-resistant polyurethane foam has a density of about 0.05-0.7 g/cm$^3$.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
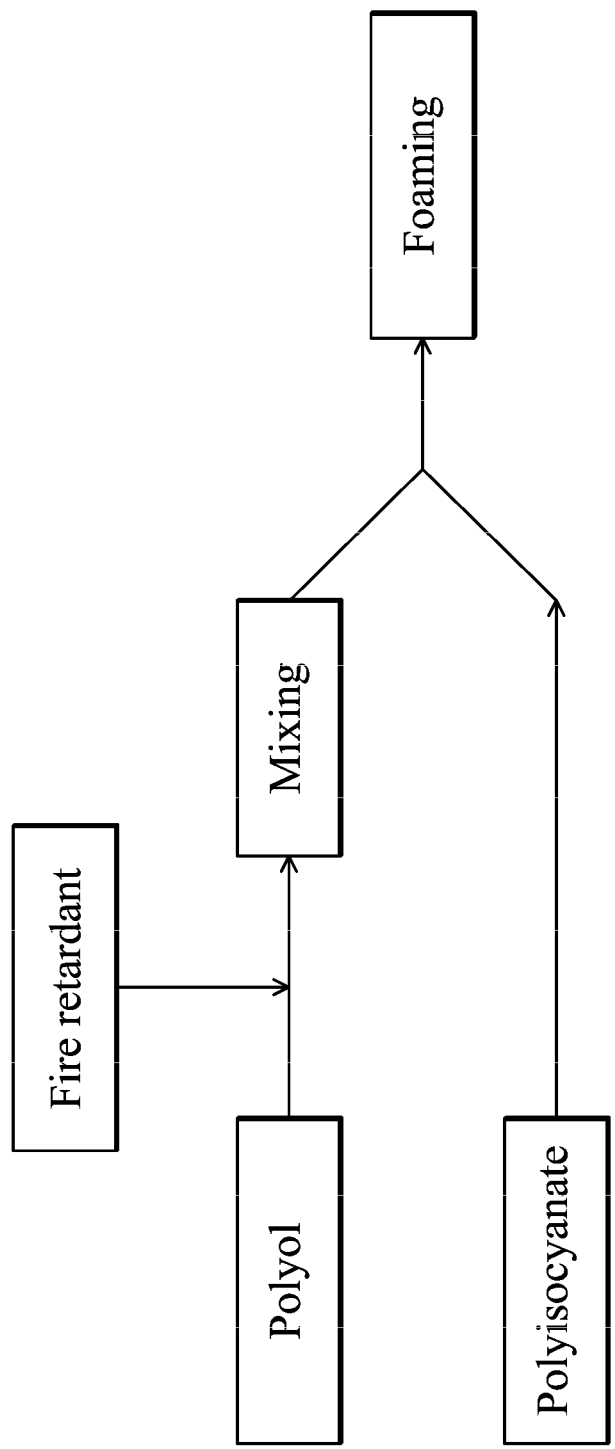
FIGS. 1-3 illustrate three conventional fabrication schemes of a fire-resistant polyurethane foam.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the disclosure provide a low-density, low-cost, high-strength, high-thermal insulation fire resistant foam by taking advantages of the low density of polyurethane foam and the fire resistance of inorganic fire retardants. In preferred embodiments, the fire-resistant foam is capable of withstanding flame temperatures of about 1000° C. for more than 1 hour without losing its structural integrity, which effectively prevents direct heat transfer (to the interior materials or objects).

Figure 4:
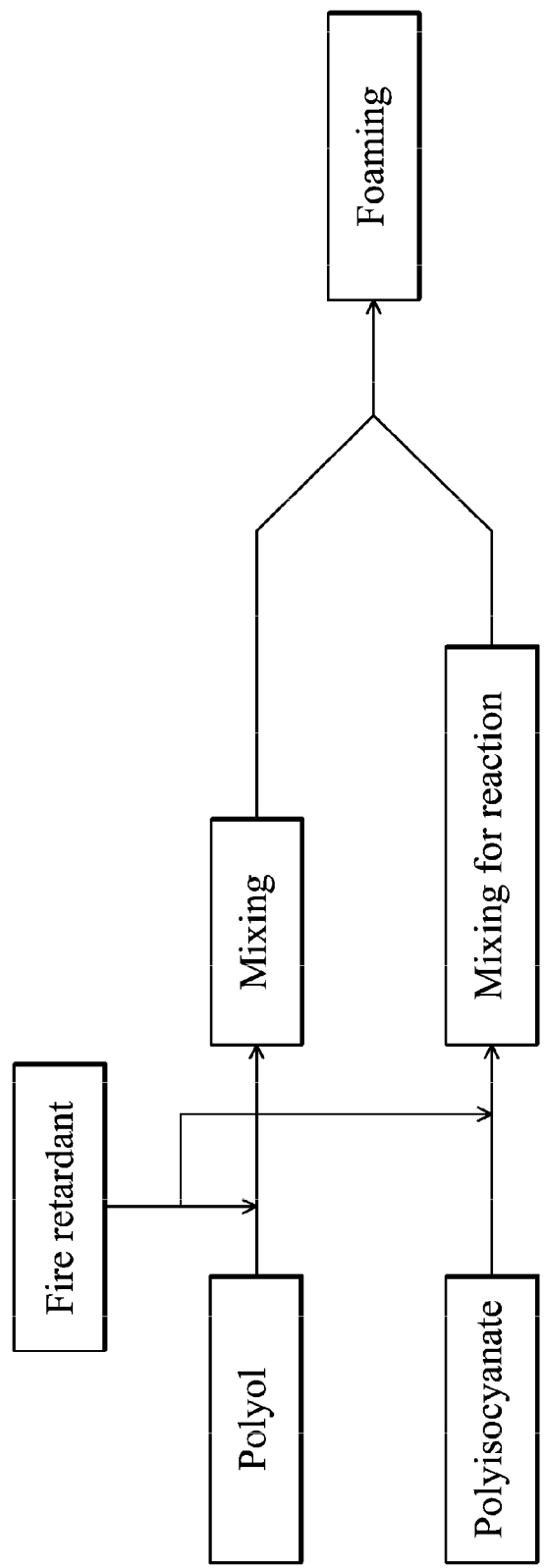
FIG. 4 illustrates a fabrication scheme of a fire-resistant polyurethane foam according to an embodiment.

FIG. 4 illustrates a fabrication scheme of a fire-resistant polyurethane foam according to an embodiment of the disclosure. As shown, to maximize the additional amount of inorganic fire retardant to improve fire resistance, a hydroxyl-containing inorganic fire retardant (e.g., aluminum hydroxide) is premixed with a polyisocyanate and a polyol, respectively, to form two premixtures. Then, the two premixtures are mixed for reaction to form a fire-resistant polyurethane foam. As such, the amount of inorganic fire retardant can be significantly increased to above 40 wt %, or preferably about 50-80 wt %.

According to an important feature of the disclosure, during the premixing procedure with polyisocyanate, the hydroxyl group of the fire retardant will react with the isocyanate (—NCO) group of the polyisocyanate; thereby increasing the permissible additional amount of the fire retardant. Moreover, the reaction forms a chemical bond between the fire retardant and the polyurethane; thus strengthening structural integrity of the composite. The resulting fire-resistant foam does not melt, shrink or produce flaming drops under exposure to flame or ignition sources.

Figure 2:
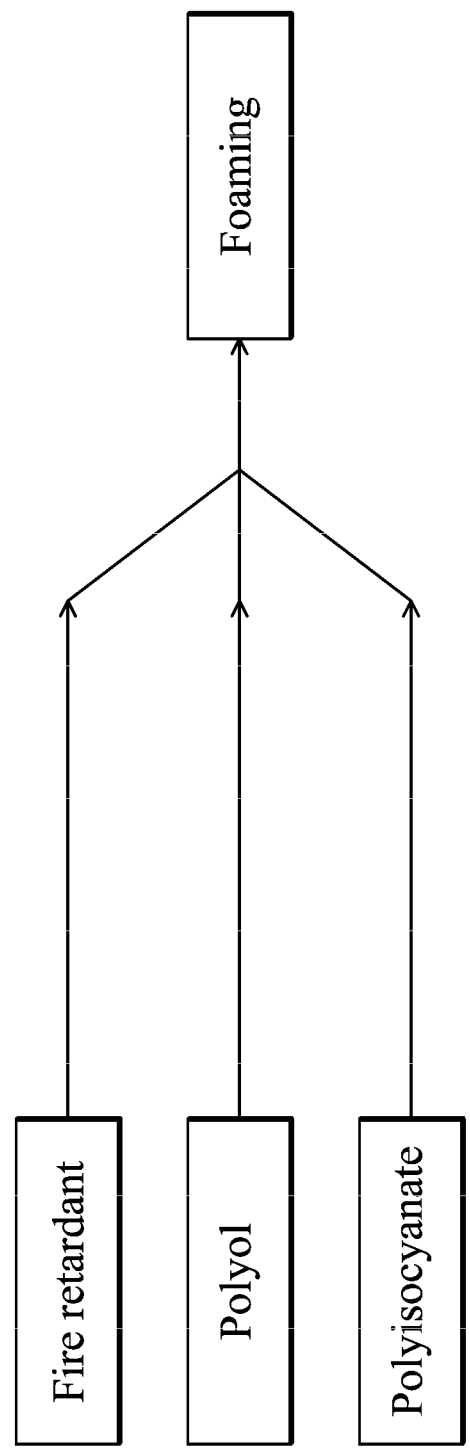
Figure 3:
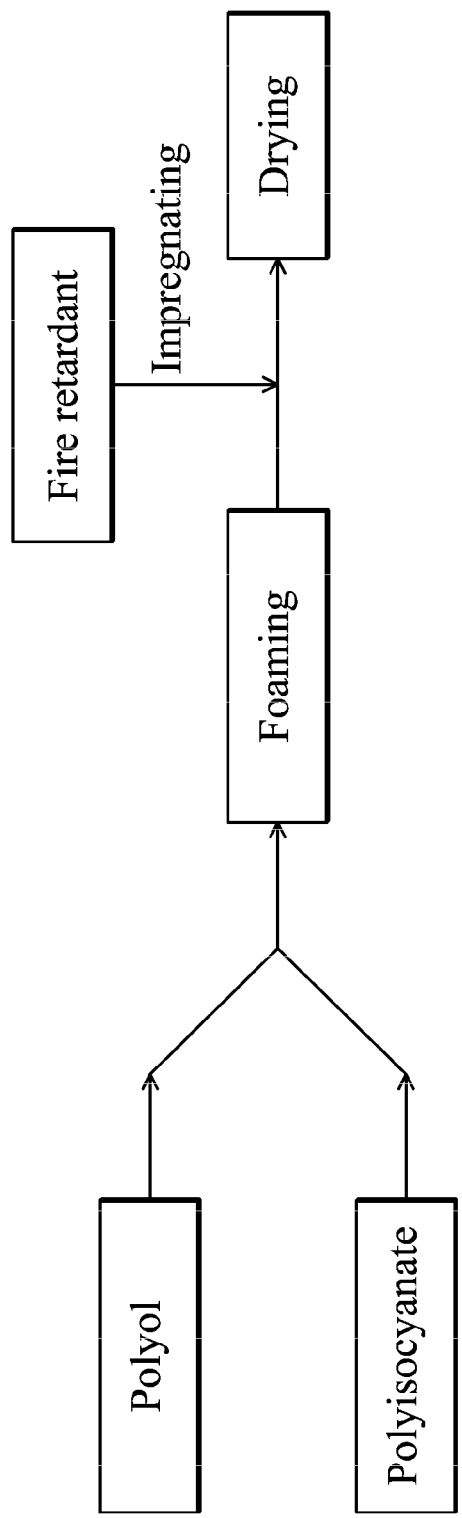

Meanwhile, in the conventional fabrication schemes of FIGS. 1-2, since the reaction between polyisocyanate and polyol is much faster than the reaction between polyisocyanate and aluminum hydroxide, polyisocyanate will first react with polyol before it has the chance to react with aluminum hydroxide. As a result, the conventional foam is likely to shrink and produce flaming drops under exposure to flame. In the conventional fabrication scheme of FIG. 3, aluminum hydroxide is only physically coated on the outer surface of polyurethane (without chemical bonding), which necessitates an additional process step and its structural integrity of the foam is not increased thereby.

According to another important feature of the disclosure, a combination of different particle sizes of the fire retardant is employed to maximize the amount of the fire retardant and increase the fire resistance of the foam. A smaller fire retardant particle can result in an abrupt increase of viscosity when added to the polyurethane reaction mixture due to the larger surface area, and therefore its additional amount is rather limited. Meanwhile, a larger fire retardant particle allows a greater additional amount, but the fire resistance is relatively poor. A combination of different particle sizes of the fire retardant can maximize the amount of the fire retardant without sacrificing the fire resistance.

Figure 5:
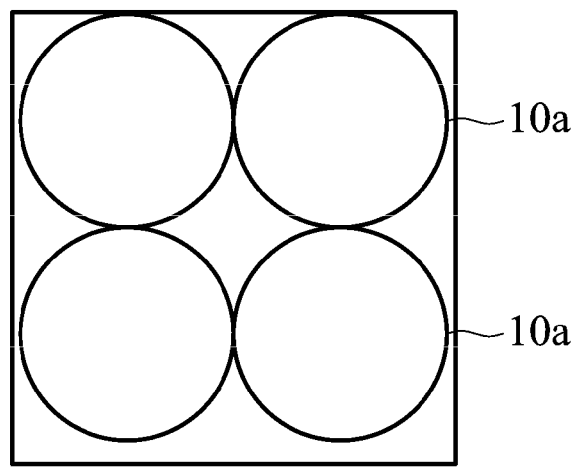
FIG. 5 is a schematic view showing the use of a single particle size for an inorganic fire retardant.
Figure 6:
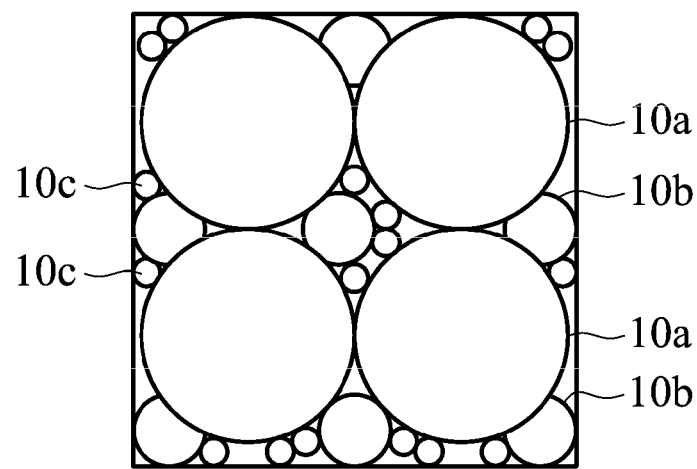
FIG. 6 is a schematic view showing the combination of different particle sizes for an inorganic fire retardant.

Referring to FIGS. 5-6, FIG. 5 shows the use of an inorganic fire retardant 10a having a single particle size, while FIG. 6 shows the use of inorganic fire retardants 10a, 10b, 10c having different particle sizes. It can be seen that the combination of different particle sizes can fill up a given space more efficiently; thereby increasing the additional amount.

In the following, details of the fabrication method and composition of the fire-resistant polyurethane foam will be described.

The polyisocyanate suitable for use herein is a compound having two or more isocyanate groups per molecule, including but not limited to: aromatic polyisocyanates, aliphatic polyisocyanates, cycloaliphatic polyisocyanates, heterocyclic polyisocyanates, and so on. A mixture of the above is also suitable for use. The polyisocyanate preferably has an NCO content of about 5-50 wt %. Representative examples of the polyisocyanate include: toluene diisocyanate (TDI), diphenylmethane-4,4'-diisocyanate (MDI), isophorone diisocyanate (IPDI), hexamethylene diisocyanate (HDI), 4,4'-dicyclohexylmethane diisocyanate ($H_{12}MDI$), p-phenylene diisocyanate (PPDI), and (p,p'-bisphenyl diisocyanate (BPDI).

The polyol suitable for use herein is a polyol having two more active groups, including polyether polyols and polyester polyols. Representative examples of the polyol include: poly(butanediol-co-adipate) glycol (PBA), polytetramethylene glycol (PTMEG), Poly(hexanediol-co-adipate) glycol (PHA), poly(ethylene-co-adipate) glycol (PEA), polypropylene glycol, and polyethylene glycol. The polyol may have a number average molecular weight ranging from about 200 to about 6000, or preferably from about 600 to about 3000. The above polyols are used either alone or in combination.

The polyol is first mixed with a blowing agent, a catalyst and a dispersing agent, followed by addition of a fire retardant to proceed with premixing. Water is the most commonly used blowing agent for polyurethane. The catalyst suitable for use herein includes metallic compounds and tertiary amines, wherein the metallic compounds are, for example, dibutyltin dilaurate (T-12), stannous octoate (T-9), and stannous oleate, and the tertiary amines are, for example, triethylenediamine, triethylamine, tripropylamine, N-ethyl morpholine, and N,N-dimethyl cyclohexanamine. The dispersing agent suitable for use herein includes Disperbyk series manufactured by BYK Chemie. In a specific embodiment, the blowing agent, the catalyst, and the dispersing agent may be present in amounts of 1 wt %, 0.1 wt %, and 2.5 wt %, respectively, based on the weight of the polyol. It will be appreciated, however, the other ratios may be used.

The hydroxyl-containing inorganic fire retardant which is suitably used herein includes, but is not limited to, aluminum hydroxide, magnesium hydroxide, silicon oxide, titanium oxide, calcium carbonate, or combinations thereof, wherein aluminum hydroxide and magnesium hydroxide are particularly preferred. The fire retardant may inherently have the hydroxyl group or have the hydroxyl group after surface modification. The hydroxyl-containing inorganic fire retardant may have a particle size ranging from about 0.5 μm to about 100 μm. Preferably, a combination of two or more different particle sizes is employed to maximize the amount of the fire retardant and increase the fire resistance. It should be noted that, however, using a fire retardant of a single particle size is permissible in the disclosure. In a specific embodiment, a combination of particles sizes of 0.5-5 μm, 5-20 μm, and 20-100 μm in a weight ratio of 1:0.1-2:0.1-2, or preferably 3:2:4, is employed. The hydroxyl-containing inorganic fire retardant may be present in an amount of about 50-80 wt %, based on the total weight of the fire-resistant polyurethane foam. The weight ratio of the fire retardant in the polyisocyanate premixture to the fire retardant in the polyol premixture is about 1:9 to about 9:1, or preferably about 1.5:1.

In addition to the hydroxyl-containing inorganic fire retardant, other fire retardants may be optionally used. For example, the fire-resistant polyurethane foam may further contain 0-10 wt % of a phosphorus-containing fire retardant (such as ammonium polyphosphate), 0-5 wt % of a nitrogen-containing fire retardant (such as melamine), 0-5 wt % of a carbonization agent (such as pentaerythritol), and 0-15 wt % of a glass fiber (such as short glass fiber), based on the total weight of the fire-resistant polyurethane foam. The above fire retardants may be premixed with the hydroxyl-containing inorganic fire retardant and then added to the polyisocyanate or polyol.

According to the fabrication method of the disclosure, the hydroxyl-containing inorganic fire retardant is premixed with a polyisocyanate and a polyol, respectively, to form two premixtures. The premixing can be carried out at a mixing speed of about 100-400 rpm for a period of about 5-30 minutes to insure a thorough mixing. Thereafter, the two premixtures are mixed at a higher speed, for example, about 1000-3000 rpm for a period of about 5-30 seconds. The resulting mixture is then placed into a mold to proceed with the foaming process. The fire-resistant polyurethane foam thus obtained may have a density of about 0.05-0.7 g/cm$^3$. In preferred embodiments, the fire-resistant polyurethane foam is capable of withstanding flame temperature of about 1000° C. for more than 1 hour without losing its structural integrity; effectively preventing direct heat transfer to the interior.

EXAMPLES

Materials a. polyisocyanate: UR-398B (polymeric MDI) from KUANG LUNG SHING CORPORATION
b. polyol: UR-398A from Kuang Lung Shing Corp.
c. dispersing agent: 2280 from Marvel Chemical
d. dispersing agent: Disperbyk-110 from BYK Chemie
e. catalyst: T-12 (dibutyltin dilaurate)
f. catalyst: DABCO 33-LV (triethylenediamine solution) from Air Products and Chemicals.
g. aluminum hydroxide: H-42M (particle size: 1 μm) from Showa Denko K.K.
h. aluminum hydroxide: H-32 (particle size: 8 μm) from Showa Denko K.K.
i. aluminum hydroxide: H-10 (particle size: 55 μm) from Showa Denko K.K.
j. nitrogen-containing fire retardant: melamine
k. phosphorus-containing fire retardant: ammonium polyphosphate
l. carbonization agent: pentaerythritol
m. short glass fiber: 202P 3.2 from Taiwan Glass Inc.
n. "MIA4": denotes a mixture of melamine, ammonium polyphosphate, and pentaerythritol in a weight ratio of 3:16:1.

In the following examples and comparative examples, all percentages are by weight unless otherwise specified.

Example 1

The ingredients and amounts thereof given in Table 1 were dried mixed to provide Fire Retardant Powder C. The ingredients and amounts thereof given in Table 2 were thoroughly mixed to provide Liquid A. 116.2 g of the Fire Retardant Powder C was added to 68.7 g of polyisocyanate (UR398B, Liquid B) and thoroughly mixed at a speed of 250 rpm for 7 minutes; thus, providing a first premixture. Meanwhile, 65.2 g of the Fire Retardant Powder C was added to Liquid A and thoroughly mixed at a speed of 250 rpm for 7 minutes; thus, providing a second premixture. The first and second premixtures were mixed at a speed of 1200 rpm for about 10 seconds, and then placed into a mold to proceed with the foaming process. A 10 cm*20 cm*4 cm foam with a density of 0.335 g/cm$^3$ was obtained, which contained 60.2% of the fire retardant.

TABLE 1

|  | weight (g) |
|---|---|
| Al(OH)$_3$ (H-42M) | 32.7 |
| Al(OH)$_3$ (H-32) | 21.8 |
| Al(OH)$_3$ (H-10) | 43.7 |
| MIA4 | 10.9 |

TABLE 2

|  | weight (g) |
|---|---|
| Polyol (UR398A) | 45.8 |
| Dispersing agent (2280) | 2.17 |
| Dispersing agent (Disperbyk-110) | 0.58 |

Comparative Example 1

The ingredients and amounts thereof given in Table 3 were dried mixed to provide Fire Retardant Powder D. All of the Fire Retardant Powder D was added to 68.7 g of polyisocyanate (UR398B, Liquid B) and thoroughly mixed at a speed of 250 rpm for 7 minutes to provide a premixture. Thereafter, the premixture and the Liquid A as in the Example 1 were mixed at a speed of 1200 rpm for about 10 seconds, and then placed into a mold to proceed with the foaming process. A 10 cm*20 cm*4 cm foam with a density of 0.339 g/cm$^3$ was obtained. The fire retardant present in the foam was 36.5%, which was the maximum amount permissible for processing.

TABLE 3

|  | weight (g) |
|---|---|
| Al(OH)$_3$ (H-42M) | 20.2 |
| Al(OH)$_3$ (H-32) | 13.5 |
| Al(OH)$_3$ (H-10) | 27 |
| MIA4 | 6.7 |

Comparative Example 2

The Fire Retardant Powder C, Liquid A, and Liquid B as in the Example 1 were mixed simultaneously at a speed of 1200 rpm for about 10 seconds. As a result, the Fire Retardant Powder C could not be uniformly dispersed in the liquid mixture and lumps caused by aggregation of powers were observed; making it impossible to introduce the reaction mixture into a mold to proceed with the foaming process. In addition, since the mixing of Liquid A and Liquid B promptly initiated the foaming process, it was impossible to fully disperse the fire retardant powder by increasing the mixing time.

Flame Test

Figure 7:
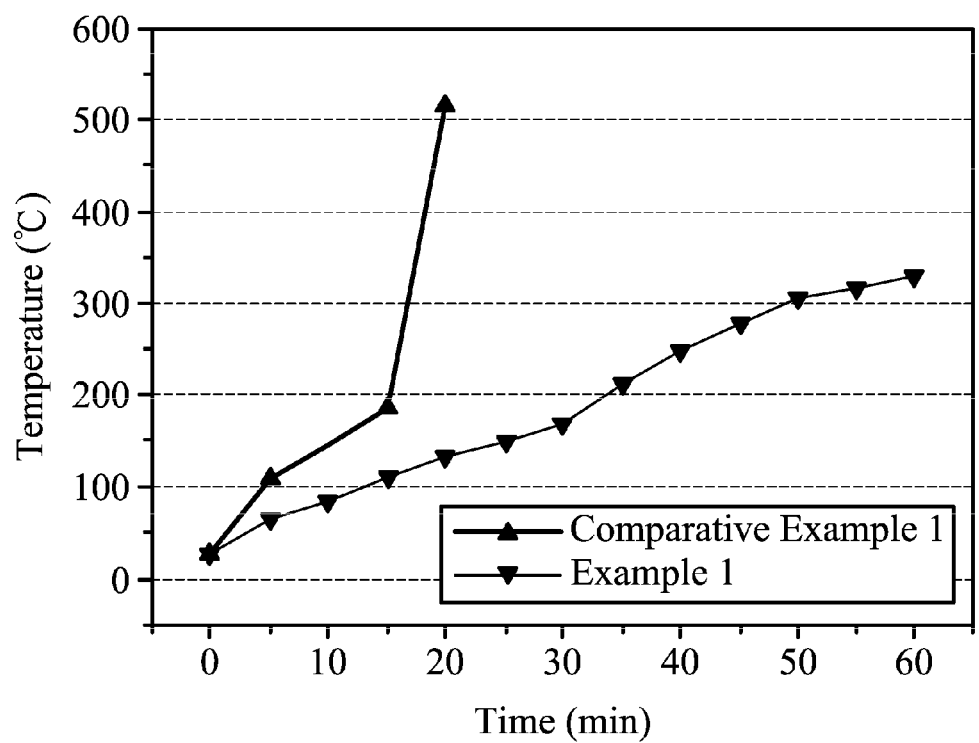
FIG. 7 is a diagram showing the backside temperature of the foams of Example 1 and Comparative Example 1 as a function of heating time.

A flame test was conducted on the foams obtained in the Example 1 and Comparative Example 1 by a gas torch (burner diameter: 1.5 inches) with a flame temperature of 950° C., during which the backside temperature of the foams was measured, wherein the results are shown in FIG. 7. The foam of the Example 1 was capable of withstanding the flame temperature for more than 1 hour and maintaining its structural integrity, while the foam of the Comparative Example 1 lost its structural integrity in less than 20 minutes due to cracking.

Example 2

The ingredients and amounts thereof given in Table 4 were dried mixed to provide Fire Retardant Powder E. The ingredients and amounts thereof given in Table 5 were thoroughly mixed to provide Liquid F. 86 g of the Fire Retardant Powder E was added to 50.9 g of polyisocyanate (UR398B, Liquid B) and thoroughly mixed at a speed of 250 rpm for 7 minutes; thus, providing a first premixture. Meanwhile, 48.3 g of the Fire Retardant Powder E was added to Liquid F and thoroughly mixed at a speed of 250 rpm for 7 minutes; thus, providing a second premixture. The first and second premixtures were mixed at a speed of 1200 rpm for about 10 seconds, and then placed into a mold to proceed with the foaming process. A 10 cm*20 cm*4 cm foam with a density of 0.27 g/cm$^3$ was obtained.

Figure 8:
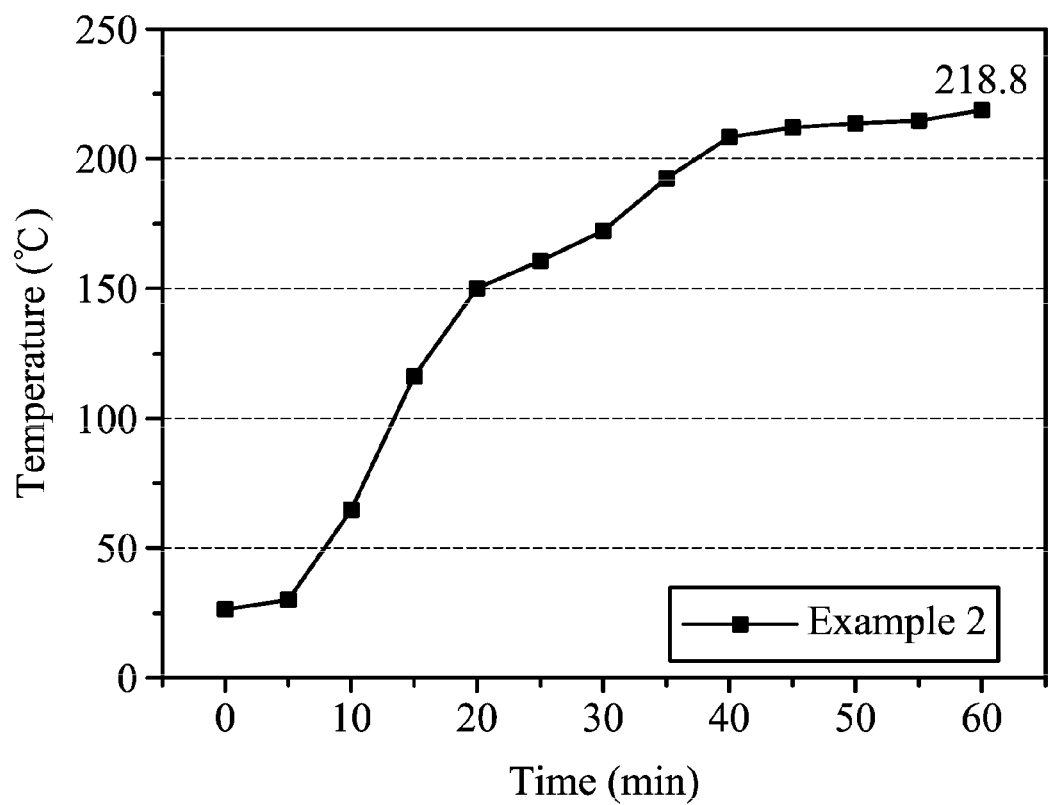
FIG. 8 is a diagram showing the backside temperature of the foam of Example 2 as a function of heating time.

A flame test was conducted on the foam by a gas torch (burner diameter: 1.5 inches) with a flame temperature of 950° C., during which the backside temperature of the foam was measured, wherein the results are shown in FIG. 8. After the flame test, the thickness of the foam shrunk from 4 cm to 3.8 cm.

TABLE 4

| | weight (g) |
|---|---|
| Al(OH)$_3$ (H-42M) | 37.4 |
| Al(OH)$_3$ (H-32) | 25 |
| Al(OH)$_3$ (H-10) | 50 |
| melamine | 1.9 |
| ammonium polyphosphate | 10 |
| pentaerythritol | 0.6 |
| Short glass fiber | 9.4 |

TABLE 5

| | weight (g) |
|---|---|
| Polyol (UR398A) | 33.9 |
| Dispersing agent (2280) | 1.61 |
| Dispersing agent (Disperbyk-110) | 0.86 |

In the Comparative Examples 3-5, aluminum hydroxide of three different particle sizes (H-42M (1 μm), H-32 (8 μm), H-10 (55 μm)) were used individually. In each of the Comparative Examples, the additional amount of the aluminum hydroxide was maximized as much as possible (before incurring unprocessable high viscosity). Therefore, the additional amount of the smaller particle was less than that of the larger particle.

Comparative Example 3

The ingredients and amounts thereof given in Table 6 were thoroughly mixed to provide Liquid G. 60 g of H-42M was added to Liquid G and thoroughly mixed at a speed of 250 rpm for 7 minutes; thus, providing a first premixture. Meanwhile, 65 g of H-42M was added to 101.8 g of polyisocyanate (UR398B, Liquid B) and thoroughly mixed at a speed of 250 rpm for 7 minutes; thus, providing a second premixture. The first and second premixtures were mixed at a speed of 1200 rpm for about 10 seconds, and then placed into a mold to proceed with the foaming process. A 4 cm*10 cm*10 cm foam with a density of 0.31 g/cm$^3$ was obtained. The fire retardant present in the foam was 41.8%.

TABLE 6

| | weight (g) |
|---|---|
| Polyol (UR398A) | 67.8 |
| Dispersing agent (2280) | 3.22 |
| Dispersing agent (Disperbyk-110) | 0.86 |

Comparative Example 4

90 g of H-32 was added to the Liquid G as in the Comparative Example 3 and thoroughly mixed at a speed of 250 rpm for 7 minutes; thus, providing a first premixture. Meanwhile, 125 g of H-32 was added to 101.8 g of polyisocyanate (UR398B, Liquid B) and thoroughly mixed at a speed of 250 rpm for 7 minutes; thus, providing a second premixture. The first and second premixtures were mixed at a speed of 1200 rpm for about 10 seconds, and then placed into a mold to proceed with the foaming process. A 4 cm*10 cm*10 cm foam with a density of 0.32 g/cm$^3$ was obtained. The fire retardant present in the foam was 55.3%.

Comparative Example 5

126 g of H-10 was added to the Liquid G as in the Comparative Example 3 and thoroughly mixed at a speed of 250 rpm for 7 minutes; thus, providing a first premixture. Meanwhile, 144 g of H-10 was added to 101.8 g of polyisocyanate (UR398B, Liquid B) and thoroughly mixed at a speed of 250 rpm for 7 minutes; thus, providing a second premixture. The first and second premixtures were mixed at a speed of 1200 rpm for about 10 seconds, and then placed into a mold to proceed with the foaming process. A 4 cm*10 cm*10 cm foam with a density of 0.34 g/cm$^3$ was obtained. The fire retardant present in the foam was 60.8%.

Figure 9:
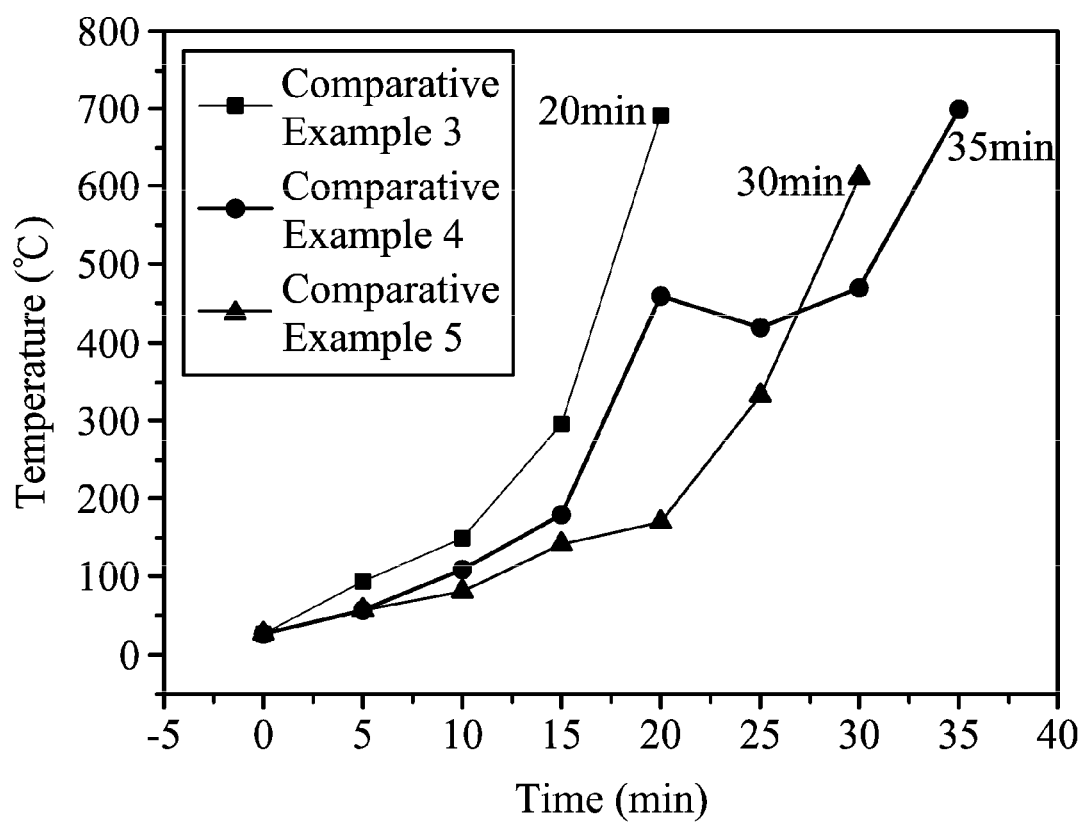
FIG. 9 is a diagram showing the backside temperature of the foams of Comparative Examples 3-5 as a function of heating time.

A flame test was conducted on the foams obtained in the Comparative Examples 3-5 by a gas torch (burner diameter 1.5 inches) with a flame temperature of 950° C., during which the backside temperature of the foams was measured, wherein the results are shown in FIG. 9. All of the foams prepared by the Comparative Examples 3-5 cracked under the same flame test applied for the Example 1.

Accordingly, the disclosure provides a low-density, fire-resistant polyurethane foam which is capable of withstanding flame temperature of about 1000° C. for more than 1 hour without losing its structural integrity. The fire resistance is higher than that produced by the conventional fabrication schemes or by a single-particle-size fire retardant.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fire-resistant polyurethane foam, comprising
   a polyurethane; and
   about 50-80 wt % of a hydroxyl-containing inorganic fire retardant, based on the weight of the fire-resistant polyurethane foam, wherein the hydroxyl-containing inorganic fire retardant reacts with the polyurethane to form a chemical bond,
   wherein the fire-resistant polyurethane foam has a density of about 0.05-0.7 g/cm$^3$,
   wherein the hydroxyl-containing inorganic fire retardant comprises particle sizes of 0.5-5 μm, 5-20 μm, and 20-100 μm in a weight ratio of 1:0.1-2:0.1-2.

2. The fire-resistant polyurethane foam as claimed in claim 1, capable of withstanding flame temperature of about 1000° C. for more than 1 hour.

3. The fire-resistant polyurethane foam as claimed in claim 1, which is prepared by:
   premixing the hydroxyl-containing inorganic fire retardant with a polyisocyanate and a polyol, respectively, to form two premixtures; and mixing the two premixture to proceed with a foaming reaction.

4. The fire-resistant polyurethane foam as claimed in claim 3, wherein the polyisocyanate has an NCO content of about 5-50 wt %.

5. The fire-resistant polyurethane foam as claimed in claim 3, wherein the polyisocyanate comprises toluene diisocyanate (TDI), diphenylmethane-4,4'-diisocyanate (MDI), isophorone diisocyanate (IPDI), hexamethylene diisocyanate (HDI), 4,4'-dicyclohexylmethane diisocyanate ($H_{12}$MDI), p-phenylene diisocyanate (PPDI), (p,p'-bisphenyl diisocyanate (BPDI), or combinations thereof.

6. The fire-resistant polyurethane foam as claimed in claim 3, wherein the polyol comprises polyether polyols, polyester polyols, or combinations thereof.

7. The fire-resistant polyurethane foam as claimed in claim 1, wherein the hydroxyl-containing inorganic fire retardant has the hydroxyl group either inherently or through a surface modification, and wherein the hydroxyl-containing inorganic fire retardant comprises aluminum hydroxide, magnesium hydroxide, silicon oxide, titanium oxide, calcium carbonate, or combinations thereof.

8. The fire-resistant polyurethane foam as claimed in claim 1, further comprising a phosphorus-containing fire retardant, a nitrogen-containing fire retardant, a carbonization agent, glass fiber, or combinations thereof.

* * * * *